United States Patent
Scherenberger et al.

(10) Patent No.: US 12,319,438 B2
(45) Date of Patent: Jun. 3, 2025

(54) DYNAMICALLY CONTROLLED CARGO LOADING SYSTEM FOR AN AIRCRAFT

(71) Applicant: Airbus Operations GmbH, Hamburg (DE)

(72) Inventors: Sven Scherenberger, Hamburg (DE); Dennis Fischer, Hamburg (DE); Oliver Nuessen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 364 days.

(21) Appl. No.: 17/894,205

(22) Filed: Aug. 24, 2022

(65) Prior Publication Data

US 2023/0068486 A1 Mar. 2, 2023

(30) Foreign Application Priority Data

Aug. 27, 2021 (EP) ..................................... 21193607

(51) Int. Cl.
*B64D 9/00* (2006.01)
*B65G 67/00* (2006.01)

(52) U.S. Cl.
CPC ............... *B64D 9/00* (2013.01); *B65G 67/00* (2013.01); *B64D 2009/006* (2013.01)

(58) Field of Classification Search
CPC ......................... B64D 9/00; B64D 2009/006
See application file for complete search history.

(56) References Cited

U.S. PATENT DOCUMENTS

| | | | | |
|---|---|---|---|---|
| 5,170,968 A * | 12/1992 | Helmner | ................ | B60P 1/365 414/528 |
| 6,135,269 A * | 10/2000 | Huber | ................. | B65G 13/065 198/782 |
| 6,328,154 B1 * | 12/2001 | Huber | .................. | B65G 43/04 198/782 |
| 6,420,846 B1 * | 7/2002 | Wolfe | .................... | B64D 9/00 198/780 |

(Continued)

FOREIGN PATENT DOCUMENTS

| | | |
|---|---|---|
| DE | 102010035099 A1 | 2/2012 |
| DE | 102011000819 A1 | 8/2012 |

(Continued)

*Primary Examiner* — Christopher P Ellis
(74) *Attorney, Agent, or Firm* — Greer, Burns & Crain, Ltd.

(57) ABSTRACT

A dynamically controlled cargo loading system for an aircraft includes electrical cargo conveying devices for conveying cargo items on a cargo loading deck; speed sensors, which are configured to capture current conveying speeds of the cargo conveying devices and/or the conveyed cargo items; electrical measuring devices, which are configured to capture current electrical parameters of the cargo conveying devices; and a control device which is configured to control the cargo conveying devices depending on the captured current conveying speeds and/or the recoded current electrical parameters such that at least one of the following variables is optimized: the electrical power consumption of the cargo conveying devices, the mechanical wear of the cargo conveying devices, the mechanical load action on the cargo items, the conveying time of the cargo items and the noise generation during the conveying of the cargo items.

14 Claims, 1 Drawing Sheet

(56) References Cited

U.S. PATENT DOCUMENTS

| | | | |
|---|---|---|---|
| 7,199,543 B1* | 4/2007 | Hettwer | B64D 9/00 198/781.01 |
| 7,387,276 B1* | 6/2008 | Smith | B64C 1/1415 244/129.1 |
| 8,788,085 B2* | 7/2014 | Panzram | B64D 9/00 700/214 |
| 9,022,208 B2* | 5/2015 | Huber | B64D 9/00 198/781.05 |
| 9,162,765 B2* | 10/2015 | Huber | B64C 1/22 |
| 10,005,564 B1 | 6/2018 | Bhatia et al. | |
| 10,173,841 B1* | 1/2019 | Ramalingam | H02K 11/27 |
| 10,782,179 B2* | 9/2020 | Daw Perez | G01G 19/086 |
| 10,929,811 B2* | 2/2021 | Cole | G06Q 10/08 |
| 10,994,865 B2* | 5/2021 | Daw Perez | B66F 9/063 |
| 11,066,168 B2* | 7/2021 | Clos | B64D 9/00 |
| 11,203,431 B2* | 12/2021 | Daw Perez | G05B 19/4189 |
| 11,459,104 B2* | 10/2022 | Harms | B64C 1/20 |
| 11,958,628 B2* | 4/2024 | Daw Perez | B65G 43/08 |
| 2004/0144622 A1 | 7/2004 | Leingang et al. | |
| 2006/0186271 A1* | 8/2006 | Jacobsen | B60P 1/36 244/137.1 |
| 2009/0121084 A1* | 5/2009 | Hettwer | B64D 9/00 244/137.1 |
| 2009/0121085 A1* | 5/2009 | Hettwer | B64D 9/00 244/137.1 |
| 2009/0304482 A1* | 12/2009 | Sanford | B64D 9/00 414/812 |
| 2010/0213313 A1* | 8/2010 | Reed | G06Q 10/08 244/118.1 |
| 2011/0084172 A1* | 4/2011 | Fairchild | B64D 9/00 187/254 |
| 2012/0101636 A1* | 4/2012 | Huber | B64D 9/00 700/275 |
| 2012/0175225 A1 | 7/2012 | Breen et al. | |
| 2012/0290126 A1 | 11/2012 | Combs et al. | |
| 2012/0312926 A1* | 12/2012 | Holzner | B64D 9/00 244/137.1 |
| 2013/0166063 A1 | 6/2013 | Panzram et al. | |
| 2013/0313073 A1 | 11/2013 | Huber | |
| 2015/0298808 A1* | 10/2015 | Huber | G06K 7/10366 701/25 |
| 2016/0117536 A1* | 4/2016 | Johnsen | G06K 7/10366 340/3.1 |
| 2023/0278694 A1* | 9/2023 | List | B64C 1/22 244/137.1 |

FOREIGN PATENT DOCUMENTS

| | | |
|---|---|---|
| DE | 102011051007 A1 | 12/2012 |
| EP | 0937643 A2 | 8/1999 |
| EP | 2444320 A2 | 4/2012 |
| EP | 2675709 B1 | 7/2015 |
| WO | 02079071 A2 | 10/2002 |

\* cited by examiner

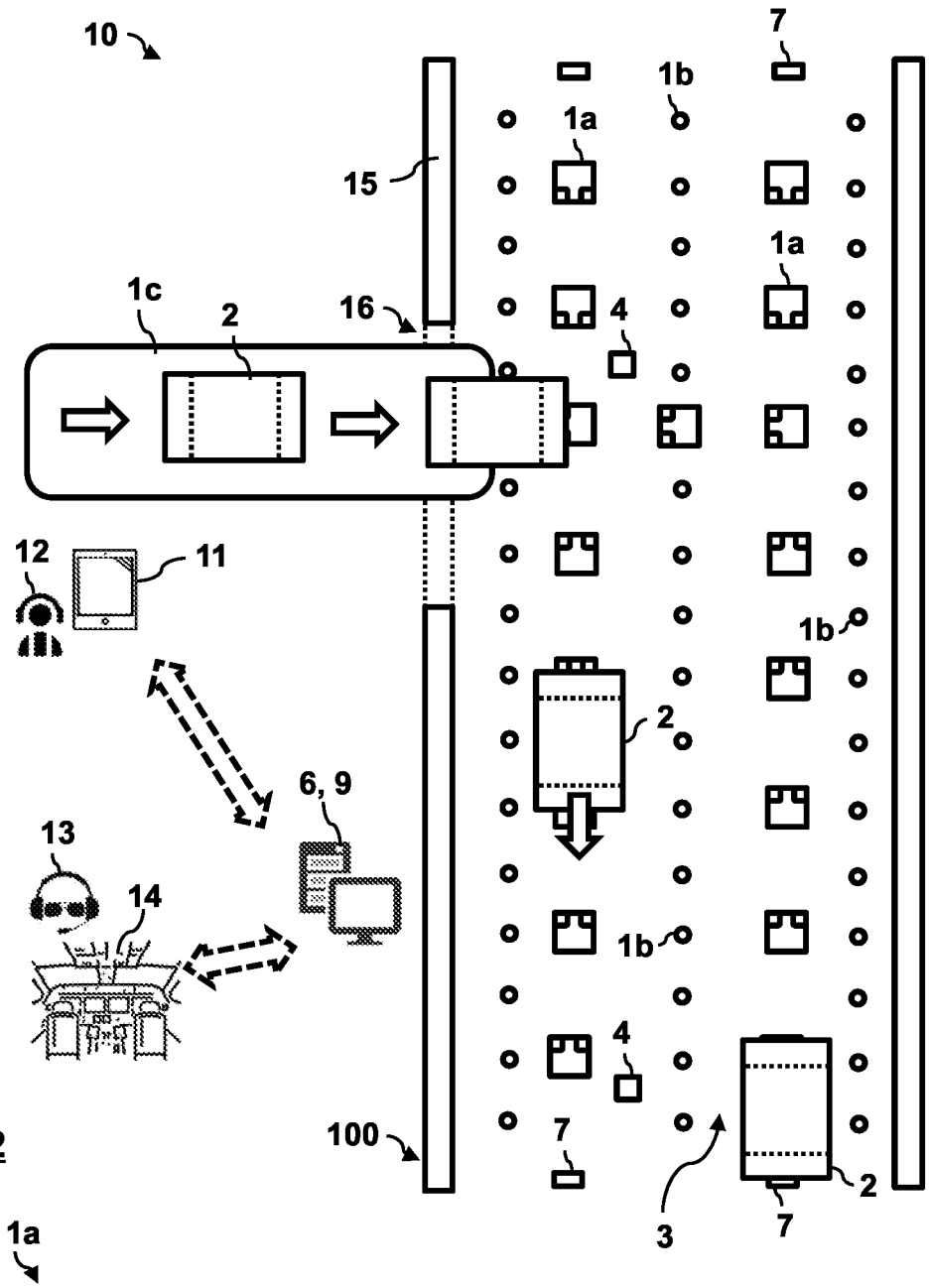
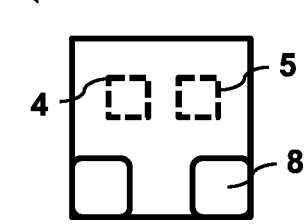

DYNAMICALLY CONTROLLED CARGO LOADING SYSTEM FOR AN AIRCRAFT

CROSS-REFERENCES TO RELATED APPLICATIONS

This application claims the benefit of the European patent application No. 21193607.5 filed on Aug. 27, 2021, the entire disclosures of which are incorporated herein by way of reference.

FIELD OF THE INVENTION

The present invention concerns a dynamically controlled cargo loading system for an aircraft.

BACKGROUND OF THE INVENTION

Cargo items such as containers or pallets or the like are usually moved by means of cargo loading systems to the positions intended for them within the hold of an aircraft, to which they are then attached and secured by means of latch elements. Here, different electrical cargo conveying devices are typically used to transport the cargo into and through the cargo hold. For example, loading platforms, conveyor belts, roller conveyors, etc., are used to bring the cargo into the cargo hold. There, they can then be moved along the cargo loading deck within the cargo hold by means of electromechanical drive units such as power drive units (PDU), roller mats, drive rollers, etc.

While classic cargo loading systems often still have to be operated and monitored manually by multiple operators, there has recently been an increasing trend to computerize and/or automate different aspects of such systems in order to make the loading process faster, more efficient, and smoother. For example, document U.S. Pat. No. 10,005,564 B1 describes an autonomous cargo loading system and method. Furthermore, document DE 10 2011 000 819 A1 describes a cargo loading system which is controlled by a computer.

Against this background, the present invention is based on the object of finding solutions for optimized cargo loading systems which better take into account the actual operational conditions.

SUMMARY OF THE INVENTION

Accordingly, a dynamically controlled cargo loading system is provided for an aircraft. The cargo loading system includes electrical cargo conveying devices for conveying cargo on a cargo loading deck; speed sensors, which are designed to capture current conveying speeds of the cargo conveying devices and/or the conveyed cargo items; electrical measuring devices, which are designed to capture current electrical parameters of the cargo conveying devices; and a control device which is designed to control the cargo conveying devices in such a way depending on the captured current conveying speeds and/or the captured current electrical parameters in such a way that at least one of the following variables is optimized: the electrical power consumption of the cargo conveying devices, the mechanical wear of the cargo conveying devices, the mechanical load action on the cargo items and the aircraft structure, the conveying time of the cargo and the noise generation during the conveying of the cargo.

Furthermore, an aircraft with a cargo loading system according to the invention is provided.

One of the ideas underlying the present invention is to equip a cargo loading system with a regulation or control concept which dynamically takes into account multiple internal and external system parameters in order to optimize the loading process with regard to energy consumption, long-term reliability, mechanical loads, wear of components, loading/unloading time, and operating costs. The cargo loading systems used in many aircraft today, on the other hand, move their loading devices on the basis of global and/or constant system parameters and not on the basis of the actual operating conditions. As a result, conventional loading systems are far less flexible and relatively inefficient, especially in cases where operational conditions deviate more from planned or regulatory states.

In this sense, an intelligent cargo loading system is created in which multiple electrical transport and/or drive devices are monitored by means of direct or indirect speed sensors and means for measuring electrical currents, voltages, and power. The sensors and measuring devices can be integrated into the system components (i.e., the cargo conveying equipment) or can be provided independently in and/or on the cargo loading deck. A control device executes a control algorithm that evaluates the measured data and appropriately controls the operating states of the transport equipment, i.e., in particular, their power consumption and/or their conveying speeds. The controller can also be integrated into one or more of the system components and/or can be provided as an external resource. The system components can be communicatively connected to each other wirelessly or via one or more data lines, such as a data bus. One or more displays can be used in and/or on the cargo loading deck to indicate system statuses and system parameters. The cargo loading system can be connected to other systems of the aircraft, for example a cabin management system, an aircraft control system, etc., and can also communicate with airport facilities, for example.

As a result, an improved cargo loading system is created, which is much more flexible and adaptable with regard to the actual operational conditions. Furthermore, the cargo loading system can be operated effectively, reliably, and ultimately more sustainably over its entire lifetime.

Advantageous embodiments and developments result from the further subordinate claims as well as from the description with reference to the figures.

According to a development, the control device may be designed to continuously adjust the conveying speeds of the cargo conveying devices according to a characteristic electrical power profile of the cargo conveying devices.

In classic cargo loading systems, there is often no provision for controlling the load handling equipment with regard to their power consumption. This means, for example, that a transport device switches directly to a nominal operating power and a resulting nominal conveying speed when switching to the conveying mode. As a result, considerable load peaks can regularly occur during operation, for example when multiple transport facilities jump into conveying mode at the same time. The electrical infrastructure must therefore be designed with correspondingly powerful safety elements, which can drive up the costs and complexity of a corresponding system.

With the present development, the conveying speeds and thus the power consumption of the cargo conveying devices are continuously monitored and (re-) regulated appropriately based on associated performance profiles. This means that individual cargo conveying devices, (sub-) groups of multiple cargo conveying devices or all cargo conveying devices can be operated together in an optimized manner in order to avoid load peaks from the outset.

According to a development, the control device may be designed to operate the cargo conveying devices when activating a conveyor operation in each case with a starting electrical power, which is less than a maximum electrical power of the respective cargo conveying device and then increase the starting power stepwise or continuously according to a characteristic electrical power profile of the respective cargo conveying device.

This development can be used to realize a "soft start" of the cargo conveying devices. If a cargo conveying device, for example a PDU, changes its operating state to a conveying mode in which drive elements such as rollers or the like are moved in order to move a cargo item, it is not necessary to apply a maximum available power. Instead, you can start with lower values, which can be increased continuously or gradually to the desired nominal value. A characteristic force/power profile can be observed in order to avoid peaks in power consumption or electrical performance.

According to a development, the control device may be designed to activate multiple cargo conveying devices in a staggered manner one after the other and/or to change their conveying speed in a staggered manner one after the other.

Thus, if a certain subgroup of the cargo conveying devices (or all together) is/are to switch to the conveying mode, their movement is not activated at the same time. Rather, they are activated one after the other at a certain time interval in order to avoid power peaks.

According to a development, the control device may be designed to reduce the electrical power of at least individual cargo conveying devices if the total electrical power of the cargo conveying devices and/or an individual electrical power of the respective cargo conveying device exceeds a specified limit.

The system can control the electrical power provided for each component and function separately or jointly based on the measured local or global electrical variables, thus improving the supplied power and the power consumption in accordance with a given optimization algorithm. In particular, as a protective measure, a temporary reduction in performance can be carried out at an upper performance limit.

According to a development, the control device may be designed to increase the electrical power of at least individual cargo conveying devices if additional electrical power is available.

Alternatively or additionally, an increase in power can also be taken into account in order to increase the system performance if appropriate, where suitable resources are available.

According to a development, the control device may be designed to lower the conveying speed for a cargo according to a reducing speed profile to bring the cargo into a rest position, and/or to raise the conveying speed according to an increasing speed profile to move the cargo from a rest position.

In addition to a soft start, a "soft stop" can also be implemented. Before a cargo reaches its provisional or final end position, the system can adjust the conveying speed according to a given speed profile to minimize the mechanical loads on the cargo and the system components.

According to a development, the control device may be designed to adjust the conveying speed for a cargo depending on a characteristic cargo parameter of the cargo. This can be done, in particular, depending on the weight of the cargo as a cargo parameter.

Thus, based on certain parameters such as the size or weight of the conveyed cargo, the transport speed can be adjusted according to a specified speed profile in order to enable a maximum or optimal individual conveying speed for each cargo item. If necessary, the corresponding parameters can be measured on site using appropriate equipment and/or calculated. Alternatively or additionally, these can also be forwarded to and/or read from the system in another way, for example by reading an RFID tag on the respective cargo, a QR code or other types of barcode or the like.

According to a development, the control device may be designed to synchronize the conveying speed between the two cargo conveying devices when a cargo item is transferred from a first cargo conveying device to a second cargo conveying device.

For example, when a cargo item is transferred from a ground support device, for example a loading platform, a loading vehicle or a conveyor belt, to a conveyor installed in the hold, a speed difference between the receiving conveyor and the dispensing conveyor can be compensated by the system according to a specified speed/load profile to avoid mechanical wear of the system components caused, for example, by friction due to an otherwise existing speed difference. Speed differences between different conveyors within the cargo hold can also be compensated for or synchronously adjusted.

According to a development, the cargo loading system may also include a large number of safety latches for locking the cargo in a respective rest position on the cargo loading deck. The safety latches may be designed to take one of the following three operating states at any time: open, closed, and locked. Furthermore, the cargo loading system may include a latch monitoring, which is designed to monitor the operating states taken by the safety latches in each case.

Thus, in a development exactly three different locking states can be captured and separated from each other: "open" (A), "closed" (B) and "locked" (C). For example, for logical evaluation, this can be expressed for each latch as follows: X=(C & /B & /A) OR (/C & B & /A) OR (/C & /B & A).

The corresponding states can be collected for all latches in the cargo hold and evaluated accordingly, so that it can be decided, for example, whether all cargo items are loaded and secured at their destination positions.

According to a development, the latch monitoring can be integrated into the control device of the cargo loading system and/or an aircraft control or connected to it communicatively.

For example, the loading staff can check the current loading and securing status of the cargo at any time from inside or outside the aircraft. For this purpose, for example, a display may be placed in the cargo hold, which can be used to display the corresponding information. Furthermore, the associated data can be forwarded via appropriate network connections, for example to the ground staff, the loading staff, the on-board staff and/or a pilot of the aircraft.

According to a development, the cargo conveying devices can have drive rollers, which are designed to orient from a horizontal orientation into an inclined orientation.

A cargo conveying device may be equipped for this purpose with one or more suitable actuators, which can adjust one or more drive rollers of the respective cargo conveying device accordingly relative to a horizontal orientation within the cargo hold, so that, for example, a slight angle of inclination relative to a floor of the cargo hold can be set. This can be used, for example, to compensate for an offset or slipping of the cargo items along the cargo compartment floor. By appropriately compensating for unevenly balanced and/or slipping cargo, mechanical stress or even damage and, for example, jamming of the cargo items can be avoided.

According to a development, the control device may be designed to capture an operational history of the cargo conveying devices, to compare it with comparative operational data profiles and, based on this, to output a functional status of the cargo conveying devices and/or an estimated remaining operating lifetime of the cargo conveying devices.

For this purpose, in particular, the captured measured variables such as speeds and electrical parameters can be evaluated and recorded. On this basis, for example, intelligent preventive maintenance can be implemented, in which a remaining time until an unscheduled failure or necessary replacement of the monitored components is estimated or predicted on the basis of an evaluation of the corresponding data. Furthermore, the current functional status of each component can be determined and communicated to the system, especially before a symptomatic reduction in performance occurs. The profiles used for comparison can be updated at any time and during operation, for example based on current system-internal and system-external data, for example derived from the operation of an active aircraft fleet.

It is understood that the present cargo loading system may provide further advantageous properties as they are or have been developed for assisted, more or less automated and/or computerized cargo loading systems. For example, the current positions of the cargo items can be monitored and continuously compared with a predefined digital loading plan and an associated loading sequence and also communicated to internal aircraft systems and external recipients. Furthermore, the cargo hold may be equipped with suitable sensors to prevent damage to cargo hold cladding (walls, ceiling, etc.) or to system components due to contact with the cargo items. This can also be applied to the cargo hold ceiling. Individual cargo items can be identified automatically, for example by means of appropriate readout devices at the entrance to the cargo hold. The system may also be (remotely) controlled and/or monitored by appropriate means, for example by means of a portable computer or other portable electronic device or the like. In particular, the freight can then be tracked and the locking states thereof checked.

The above designs and development can be combined with each other as desired, where this makes sense. Further possible embodiments, developments and implementations of the invention also include not explicitly mentioned combinations of features of the invention described above or below with regard to the exemplary embodiments. In particular, the person skilled in the art will also add individual aspects as improvements or additions to the respective basic form of the present invention.

BRIEF DESCRIPTION OF THE DRAWINGS

The present invention is explained in more detail below on the basis of the exemplary embodiments given in the schematic figures. In the figures:

FIG. 1 shows a schematic perspective top view of a cargo loading deck of an aircraft with a cargo loading system according to an embodiment of the invention; and FIG. 2 shows a detailed view of a cargo conveying device from the cargo loading system of FIG. 1.

The enclosed figures are intended to provide a further understanding of the embodiments of the invention. They illustrate embodiments and serve in connection with the description for the explanation of principles and concepts of the invention. Other embodiments and many of the advantages mentioned arise in relation to the drawings. The elements of the drawings are not necessarily shown to scale relative to each other.

In the figures of the drawing, identical, functionally identical, and identically acting elements, features, and components—unless otherwise stated—are each provided with the same reference characters.

DETAILED DESCRIPTION OF THE PREFERRED EMBODIMENTS

FIG. 1 shows a schematic perspective top view of a cargo loading deck 3 of an aircraft 100 with a cargo loading system 10 according to an embodiment of the invention.

The cargo deck 3 is essentially rectangular and extends in the X-Y plane of the aircraft 100 (the X direction corresponds to the longitudinal direction of the aircraft and the Y direction to the lateral direction) and is laterally bounded by cargo hold walls 15. The left side wall is partly interrupted to form a cargo hold door 16. Through the cargo hold door 16, cargo items 2 can be introduced into the cargo hold of the aircraft 100, for example a ULD (Unit Load Device) such as containers or pallets, and there on the cargo loading deck 3 can be moved to a designated position.

For the transport of the cargo items 2 on and over the cargo deck 3, differently designed cargo conveying devices 1a-c are provided. On the cargo deck 3, cargo items 2 can be moved by means of first cargo conveying devices 1a and second cargo conveying devices 1b. In the present case, the first cargo conveying devices 1a are by way of example designed as PDUs, i.e., electrically operated drive units with one or more drive rollers 8 (see FIG. 2). The second cargo conveying devices 1b, on the other hand, are simple drive rollers. To convey the cargo items 2 on the cargo deck 3, a third cargo conveying device 1c protrudes through the cargo hold door 16, for example an electrically driven conveyor belt, which is mounted on a ground vehicle. It is understood here that the described design of the cargo conveying devices 1a-c is to be understood purely as an example and also other types of freight conveying devices and arrangements or configurations can be envisaged by the person skilled in the art.

The cargo items 2 can be automatically identified when passing through the cargo hold door 16 or in the entrance area of the cargo loading deck 3 by means of RFID sensor devices or other identification aids (not shown), wherein, for example, an identifier including relevant cargo parameters such as size, weight, etc. can be read. This identifier may be stored, for example, in an RFID tag or the like, which is attached to and/or integrated into the cargo item 2. Subsequently, each cargo item 2 can be tracked by means of appropriate position sensors (also not shown) along its way over the cargo loading deck 3 to a temporary or final rest position, at which it can then be secured by means of one or more safety latches 7.

An essential component of the cargo loading system 10 shown is a control device or controller 6, which is communicatively connected to the different sensors and actuators at and on the cargo deck 3, in particular to the electrical cargo conveying devices 1a-c. The control device 6 may be equipped with appropriate hardware and software, which may be installed inside and/or outside the cargo hold. Both wired (for example via a data bus) and wireless networks can be considered as data connections. Via these networks, the control device 6 can also be connected to a display 11 of an operating device of the ground staff or loading staff 12 and/or to an aircraft controller 14 of the on-board staff, so that current information can be forwarded at any time to the corresponding responsible persons or can be called up by them.

The cargo loading system 10 also includes speed sensors 4, which are designed to capture current conveying speeds of the cargo conveying devices 1a-c and/or the conveyed cargo items 2. On the one hand, speed sensors 4 may be separate units distributed over the cargo deck 3 or otherwise within the cargo hold (see FIG. 1). On the other hand, the speed sensors 4 can also be integrated into the cargo conveying devices 1a-c (see FIG. 2). Furthermore, the speed sensors 4 can directly record the actual speed of movement of the cargo items 2. Alternatively or additionally, however, they can also determine a transport speed set on the cargo conveying devices 1a-c, for example by recording the rotation speed of a drive roller. This can also be done, for example, indirectly, by using operating parameters of the cargo conveying devices 1a-c, from which the set conveying speed can be extracted or derived. A speed determination can thus be carried out both directly and indirectly.

The cargo loading system 10 also includes electrical measuring devices 5, which are designed to capture current electrical parameters of the cargo conveying devices 1a-c. Suitable electrical parameters include, for example, electrical currents, electrical voltages and, in particular, electrical power. These measuring devices 5 may also be integrated, in particular, into the cargo conveying devices 1a-c (see FIG. 2) or at least may be coupled to them in order to be able to determine the corresponding variables.

The control device 6 is designed to control the cargo conveying devices 1a-c depending on the captured current conveying speeds and/or the captured current electrical parameters in such a way that the electrical power consumption of the cargo conveying devices 1a-c, the mechanical wear of the cargo conveying devices 1a-c, the mechanical load action on the cargo items 2, the conveying time of the cargo items 2 and/or the noise generation during the conveying of the cargo items 2 is optimized. Several examples of how this can be specifically implemented are explained below.

In one version, the control device 6 may be designed to continuously adjust the conveying speeds of the cargo conveying devices 1a-c according to a characteristic electrical power profile of the cargo conveying devices 1a-c. For example, when activating a conveyor operation, the control device 6 may be designed to operate the cargo conveying devices 1a-c with a respective electrical starting power, which is less than a maximum electrical power of the respective cargo conveying device 1a-c. The starting power can then be increased stepwise or continuously according to a characteristic electrical power profile of the respective cargo conveying device 1a-c. In other words, the cargo conveying devices 1a-c can start up gently when switching to a transport mode, for example when they receive a cargo item 2, in order to avoid power peaks, for example.

In the event that multiple cargo conveying devices 1a-c are to be used in combination, it may be provided that multiple cargo conveying devices 1a-c are activated one after the other by the control device 6 and/or their conveying speed is changed one after the other, i.e., for example, increased in a staggered stepwise manner in order to avoid power peaks in this case as well.

In a further embodiment, the control device 6 may be designed to reduce the electrical power of at least individual cargo conveying devices 1a-c if the total electrical power of the cargo conveying devices 1a-c and/or an individual electrical power of the respective cargo conveying device 1a-c exceeds a specified limit value (protective function). Accordingly, the control device 6 may also be designed to increase the electrical power of at least individual cargo conveying devices 1a-c if additional electrical power is available (power increase). In this way, the electrical power consumption can be optimized and controlled.

Just as the cargo conveying devices 1a-c can be run up gently, it is also possible to run them down continuously or in individual steps, for example to stop a cargo item 2 in a temporary or final position. Accordingly, the control device 6 may be designed to reduce the conveying speed for a cargo item 2 according to a reducing speed profile in order to bring the cargo item 2 into a rest position, and/or to raise it according to an increasing speed profile to move the cargo item 2 from a rest position. In this way, mechanical loads on the cargo items 2 and the cargo conveying devices 1a-c can be kept as low as possible.

In general, during the transport of cargo items 2, their conveying speed can be adjusted depending on characteristic cargo item parameters, for example as a function of the size or weight of the cargo items 2, in order to realize the most efficient and fast loading process possible. In another example, the conveying speed can be optimized to a sensitivity of the respective cargo items 2, for example in the course of a damage-cost assessment in the event of a shock or the like.

In order to make the transition of the cargo items 2 between the individual cargo conveying devices 1a-c as smooth and fluid as possible, the control device 6 may be designed to synchronize the conveying speed between the two cargo conveying devices 1a-c when transferring a cargo item 2 from a first cargo conveying device 1a-c to a second cargo conveying device 1a-c. In a specific example, a cargo item 2 can be transferred from a cargo conveying device 1c in the form of a conveyor belt 1c to a cargo conveying device 1a in the form of a PDU (see FIG. 1 in the upper left in the area of the cargo hold door 16). Matching the individual conveying speeds as precisely as possible minimizes mechanical wear and thus increases the service life of the individual components.

The smooth transport and positioning of cargo items 2 can also be improved by eliminating or at least compensating for any unevenness or tolerance in the conveying plane. An advantageous solution in this sense provides that the drive rollers 8 of the cargo conveying devices 1a-c are designed to align themselves from a horizontal orientation into an inclined orientation, for example to avoid jamming or blocking of the cargo items 2 due to alignment tolerances.

In order to further improve the overall system performance, the control device 6 can record an operational history of the cargo conveying devices 1a-c and compare this with comparative operational data profiles. For example, such profiles may have been generated over the years of operation of an aircraft fleet. Based on such a comparison, a functional status of the cargo conveying devices 1a-c and/or an estimated remaining operating life of the cargo conveying devices 1a-c can then be determined.

In addition to the cargo conveying devices 1a-c, other components or devices of the cargo loading system 10 can also be integrated into the control or monitoring. For example, the already mentioned safety latches 7 can be managed by a latch monitoring device 9, which can be integrated, for example, in the control of the cargo loading system 10 and can communicate with the ground staff or loading staff 12 and/or the on-board staff 13, such as the so-called load master and/or the crew including the pilot. In this way, an operational state of each of the safety latches 7 can be monitored at any time. For example, the loading staff 12 can check whether the individual safety latches 7 are open, closed, or locked. Such information can be displayed, for example, by displays, for example on a tablet computer.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

It goes without saying that the above exemplary versions can be combined with each other as desired. As a result, an improved cargo loading system is provided, which can automatically adapt to the respective actual operational conditions and thus not only improve the performance and speed of the loading process, but also helps to increase the long-term functionality and reliability of cargo item loading and unloading.

In the previous detailed description, various features have been summarized in one or more examples to improve the rigor of the representation. However, it should be clear that the above description is merely illustrative, but by no means restrictive. It serves to cover all alternatives, modifications and equivalents of the various features and exemplary embodiments. In view of the above description, many other examples will be immediately and directly clear to the person skilled in the art due to his professional knowledge.

The exemplary embodiments were selected and described in order to be able to present the principles underlying the invention and their possible applications in practice in the best possible way. As a result, persons skilled in the art can optimally modify and use the invention and its various exemplary embodiments with regard to the intended purpose. In the claims as well as the description, the terms "containing" and "having" are used as neutral language terms for the corresponding term "comprising".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE CHARACTER LIST 1a-c Cargo conveying devices
2 Cargo item
3 Cargo loading deck
4 Speed sensor
5 Measuring device
6 Control device
7 Safety latch
8 Drive roller
9 Latch monitoring device
10 Cargo loading system
11 Display
12 Loading staff/ground staff
13 On-board staff
14 Aircraft controller
15 Cargo hold wall
16 Cargo hold door
100 Aircraft

The invention claimed is:

1. A dynamically controlled cargo loading system for an aircraft, comprising:
   electrical cargo conveying devices to convey cargo items on a cargo deck, wherein the electrical cargo conveying devices comprise drive rollers which are configured to orient from a horizontal orientation into an inclined orientation;
   speed sensors configured to capture current conveying speeds of at least one of the cargo conveying devices or the conveyed cargo items;
   electrical measuring devices configured to capture current electrical parameters of the cargo conveying devices; and
   a controller configured to control the cargo conveying devices depending on at least one of the captured current conveying speeds or the captured current electrical parameters such that at least one of the following variables is adjusted:
      electrical power consumption of the cargo conveying devices,
      mechanical wear of the cargo conveying devices,
      mechanical load action on the cargo items,
      conveying time of the cargo items, and
      noise generation during transport of the cargo items.

2. The cargo loading system according to claim 1, wherein the control device is configured to continuously control the conveying speeds of the cargo conveying devices according to a characteristic electrical power profile of the cargo conveying devices.

3. The cargo loading system according to claim 1, wherein the control device is configured to operate the cargo conveying devices when activating a conveying operation, each with an electrical starting power which is less than a maximum electrical output of the respective cargo conveying device, and the starting power must then be increased gradually or continuously according to a characteristic electrical power profile of the respective cargo conveying device.

4. The cargo loading system according to claim 1, wherein the control device is configured to at least one of activate multiple cargo conveying devices in a staggered manner one after the other or change their conveying speed in a staggered manner one after the other.

5. The cargo loading system according to claim 1, wherein the control device is configured to reduce the electrical power of at least individual cargo conveying devices if at least one of a total electrical power of the cargo conveying devices or an individual electrical power of the respective cargo conveying device, exceeds a specified limit value.

6. The cargo loading system according to claim 1, wherein the control device is configured to increase the electrical power of at least individual cargo conveying devices if additional electrical power is available.

7. The cargo loading system according to claim 1, wherein the control device is configured to at least one of reduce the conveying speed for a cargo item according to a reducing speed profile in order to bring the cargo into a rest position, or increase the speed according to an increasing profile to move the cargo from a rest position.

8. The cargo loading system according to claim 1, wherein the control device is configured to adjust the conveying speed for a cargo item as a function of a characteristic cargo item parameter of the cargo item.

9. The cargo loading system according to claim 8, wherein the characteristic cargo item parameter comprises a weight of the cargo item.

10. The cargo loading system according to claim 1, wherein the control device is configured to determine the conveying speed when transferring a cargo item from a first cargo conveying device to a second cargo conveying device between the first and second cargo conveying devices.

11. The cargo loading system according to claim 1, further comprising:
   a number of safety latches for locking the cargo items in a respective rest position on the cargo loading deck, wherein the safety latches are configured to take one of three operational states at any time: open, closed and locked; and
   a latch monitoring device, which is configured to monitor the operational states taken up by the respective safety latches.

12. The cargo loading system according to claim 11, wherein the latch monitoring device is integrated into at least one of the control device of the cargo loading system or an aircraft controller or is communicatively connected to at least one of the control device of the cargo loading system or the aircraft controller.

13. The cargo loading system according to claim 1, wherein the control device is configured to capture an operating history of the freight conveying devices, to compare the operating history with comparative operational profiles and based on the comparison, to output at least one of a functional status of the cargo conveying devices or an estimated remaining operating life of the cargo conveying devices.

14. An aircraft with a cargo loading system according to claim 1.

* * * * *